United States Patent
Uemura et al.

(10) Patent No.: US 9,477,035 B2
(45) Date of Patent: Oct. 25, 2016

(54) OPTICAL DEVICE

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Hitoshi Uemura, Sakura (JP); Katsuhiro Takenaga, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-Shi, Hokkaido (JP)

( * ) Notice: Subject to any disclaimer, the term of this patent is extended or adjusted under 35 U.S.C. 154(b) by 0 days.

(21) Appl. No.: 14/618,147

(22) Filed: Feb. 10, 2015

(65) Prior Publication Data
US 2015/0234120 A1 Aug. 20, 2015

(30) Foreign Application Priority Data
Feb. 14, 2014 (JP) ................. 2014-026624

(51) Int. Cl.
*G02B 6/028* (2006.01)
*G02B 6/036* (2006.01)
*G02B 6/02* (2006.01)

(52) U.S. Cl.
CPC ........... *G02B 6/02042* (2013.01); *G02B 6/028* (2013.01); *G02B 6/03611* (2013.01); *G02B 6/0286* (2013.01); *G02B 6/0288* (2013.01)

(58) Field of Classification Search
CPC G02B 6/02042; G02B 6/028; G02B 6/0288; G02B 6/0281; G02B 6/0283; G02B 6/0285; G02B 6/0286
USPC ............ 385/15, 43, 115–117, 123–128, 141, 385/142, 144
See application file for complete search history.

(56) References Cited

U.S. PATENT DOCUMENTS

| 6,275,638 B1* | 8/2001 | Sasaoka et al. ............. 385/127 |
| 6,535,678 B1* | 3/2003 | Yamauchi et al. ........... 385/123 |
| 2004/0165849 A1* | 8/2004 | Mukasa ....................... 385/127 |

(Continued)

FOREIGN PATENT DOCUMENTS

| JP | 2012-524302 A | 10/2012 |
| JP | 2013-522677 A | 6/2013 |

(Continued)

OTHER PUBLICATIONS

Notice of Allowance dated Aug. 2, 2016, issued in counterpart Japanese Patent Application No. 2014-026624, with English translation. (6 pages).

*Primary Examiner* — Kaveh C Kianni
*Assistant Examiner* — Hung Lam
(74) *Attorney, Agent, or Firm* — Westerman, Hattori, Daniels & Adrian, LLP

(57) ABSTRACT

An optical device includes: multiple cores each including an inner core and an outer core surrounding an outer circumferential surface of the inner core without any gap therebetween; and cladding surrounding an outer circumferential surface of the cores without any gap therebetween and having a refractive index lower than that of the outer core, wherein each of the cores has a tapered portion that is tapered from one side toward the other side thereof in a longitudinal direction, each of the inner cores includes a low-refractive-index portion, and a high-refractive-index portion surrounding an outer circumferential surface of the low-refractive-index portion without any gap therebetween and having a refractive index higher than that of the low-refractive-index portion, and the outer core has a refractive index lower than that of the high-refractive-index portion.

3 Claims, 10 Drawing Sheets

(56) References Cited

U.S. PATENT DOCUMENTS

2010/0278486 A1 11/2010 Holland et al.
2013/0216184 A1* 8/2013 Kopp et al. .................... 385/43

FOREIGN PATENT DOCUMENTS

| WO | 2011/116109 A1 | 9/2011 |
| WO | 2012/161809 A1 | 11/2012 |

* cited by examiner

FIG. 3A
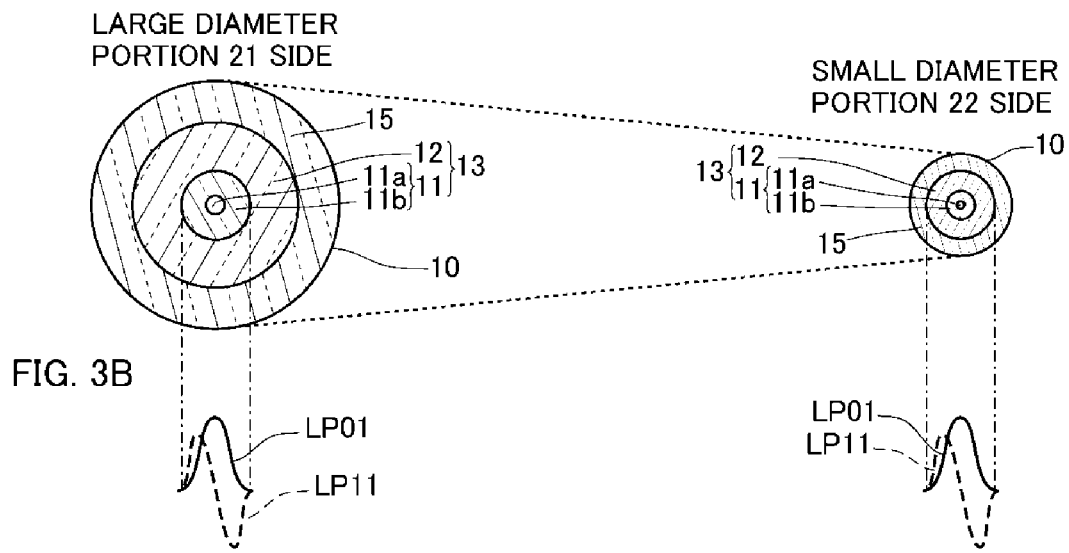
FIG. 3B
FIG. 4
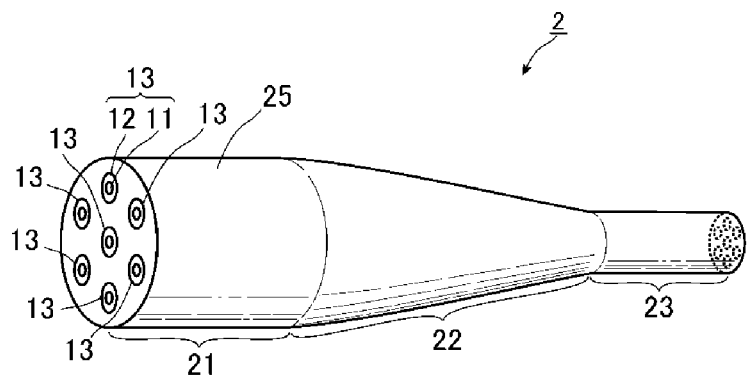

OPTICAL DEVICE

BACKGROUND OF THE INVENTION

The present invention relates to an optical device that is suitable for entrance and emission of light in multiple modes.

Optical fibers used in optical fiber communication systems that are generally and widely used have a structure in which the outer circumference of a single core is surrounded by cladding, and information is transmitted as a result of propagation of optical signals through the core. In recent years the amount of transmitted information has been drastically increased with the widespread use of optical fiber communication systems.

To realize the increase in the transmission capacity of such an optical fiber communication system, it is known to use a multicore fiber in which the outer circumference of multiple cores is surrounded by a single cladding to transmit multiple signals using light rays propagating through the respective cores.

An example of optical devices that causes light enter a multicore fiber and emits light therefrom is disclosed in Patent Document 1 mentioned below. This optical device is formed by integrating and stretching a single-core optical fiber in each of multiple holes formed in a capillary, the optical fibers being tapered from one ends to the other ends thereof. Each of the optical fibers has a double structure in which a core includes an inner core and outer cores surrounding the inner core without any gap therebetween. The inner core has a higher refractive index than the outer cores, and cladding has a lower refractive index than the outer cores. At the aforementioned one end that is not tapered, the diameter of the inner core and the difference in refractive index between the inner core and the outer cores are set so that single-mode light easily propagates through the inner core. At the aforementioned other end that is tapered, the outer diameter of the outer cores and the difference in refractive index between the outer cores and the cladding are set so that light diffuses to the outer cores and single-mode light easily propagates through the core combining the inner core and the outer cores.

In this optical device, the single-mode light propagating from one end to the other of each optical fiber propagates through the inner core at the one end, but light leakage from the inner core to the outer cores is increased as the diameter of the inner core becomes smaller than a predetermined diameter with the tapering. Thus, at the part where the diameter of the inner core is smaller than the predetermined diameter, light diffuses to the outer cores and propagates through the core combining the inner core and the outer cores. In this optical device, variation in the mode field diameter (MFD) of light propagating through each optical fiber is thus suppressed although the distance between optical fibers is small.

[Patent Document 1] JP-A-2013-522677

SUMMARY OF THE INVENTION

The optical device disclosed in Patent Document 1 is on the assumption of propagating single-mode light. Thus, in this optical device, conditions such as the refractive indices and the diameters of the inner core and the outer cores are set so that single-mode light propagates as described above.

In optical communication, multimode communication in which information is transmitted by superimposing information on light in an LP01 mode (basic mode) and also superimposing information on light in a mode such as an LP11 mode that is a higher-order mode than the basic mode to transmit information is known. The present inventors have therefore found that light loss may become greater when the core diameter is made larger to propagate multimode light in the double structure of the core as in Patent Document 1.

The cause for this can be considered to be as follows. Light in the LP01 mode has its peak intensity at the center of the core and the intensity becomes smaller toward the outer circumference of the core. Light in the LP01 mode thus does not have its peak intensity at positions other than the center of the core. In contrast, light in the higher-order mode has its peak intensity at parts other than the center of the core. The intensity of light in an odd mode, for example, becomes zero at the center of the core and comes to its peak at positions other than the center of the core. Furthermore, light in an even mode other than the LP01 mode, for example, has its peak intensity at the center of the core but also has its peak intensity at positions other than the center of the core. Thus, light in the LP01 mode propagating through the optical device tends to propagate through the inner core even when the diameter of the inner core becomes smaller with the tapering. In contrast, since light in the higher-order mode has its peak intensity at positions other than the center of the core, the light cannot propagate only through the inner core but tends to diffuse to the outer cores and propagate through the core combining the inner core and the outer cores even under such conditions that light in the LP01 mode propagates through the inner core. Thus, when multimode light is incident on one end that is not tapered of the optical device, light in the LP01 mode may be emitted in a state propagating through the inner core and light in the higher-order mode may be emitted in a state propagating through the core combining the inner core and the outer cores from the other end that is tapered. In this case, since the core is tapered at the other end, the mode field diameter of the light in the LP01 mode is smaller than that of the light in the higher-order mode.

When emitted light having different field mode diameters between light in the LP01 mode and light in the LP11 mode enters a multicore fiber connected to the optical device, the mode field diameter of light of at least one of the modes is likely to suddenly change after entering the multicore fiber and light loss is likely to be large.

An object of the present invention is therefore to provide an optical device capable of suppressing light loss.

To achieve such an object, an optical device according to the present invention includes: multiple cores each including an inner core and an outer core surrounding an outer circumferential surface of the inner core without any gap therebetween; and cladding surrounding an outer circumferential surface of the cores without any gap therebetween and having a refractive index lower than that of the outer core, wherein each of the cores has a tapered portion that is tapered from one side toward the other side thereof in a longitudinal direction, each of the inner cores includes a low-refractive-index portion, and a high-refractive-index portion surrounding an outer circumferential surface of the low-refractive-index portion without any gap therebetween and having a refractive index higher than that of the low-refractive-index portion, and the outer core has a refractive index lower than that of the high-refractive-index portion.

With this optical device, light propagating through one side that is not tapered of each core toward the other side thereof that is tapered propagates through the inner core, diffuses to the outer core at a position at the tapered portion and propagates through the entire core combining the inner core and the outer core. In this case, since the refractive index of the inner core is such that the low-refractive-index portion is surrounded by the high-refractive-index portion, the light intensity profile of light in the LP01 mode diffuses toward the outer circumference of the core more easily than a case in which the refractive index of the core is uniform. Light in the LP01 mode can therefore be easily switched from the state propagating through the inner core to the state propagating through the entire core combining the inner core and the outer core with the tapering of the core. Furthermore, light in another mode can also be switched from the state propagating through the inner core to the state propagating through the entire core combining the inner core and the outer core with the tapering of the core. In this manner, light in the LP01 mode can be suppressed from remaining in the inner core in a state in which the core is tapered, and emission of light in a state in which the mode field diameters of lights in the respective modes are greatly different can be suppressed, and light loss can be suppressed.

Alternatively, the low-refractive-index portion may have a refractive index that is between the refractive index of the high-refractive-index portion and the refractive index of the outer core.

Alternatively, the low-refractive-index portion may have a refractive index not larger than the refractive index of the outer core.

In this case, the low-refractive-index portion preferably has a refractive index equal to the refractive index of the outer core. In this case, the refractive index profile of the core can be made closer to constant than the case in which the refractive index of the low-refractive-index portion is different from that of the outer core.

Alternatively, the low-refractive-index portion may have a refractive index that is between the refractive index of the outer core and the refractive index of the cladding.

Alternatively, the low-refractive-index portion may have a refractive index not larger than the refractive index of the cladding.

Alternatively, the low-refractive-index portion may have a refractive index equal to the refractive index of the cladding. With such a structure, when the refractive index of the cladding is equivalent to the refractive index level of pure quartz, the low-refractive-index portion can be produced without adding any additive to quartz, which makes control of refractive indices and production of glass easier.

In this case, when a radius of the inner core is represented by $r_1$, a radius of an outer circumference of the outer core is represented by $r_2$, a diameter of the low-refractive-index portion is represented by d, a relative refractive index difference of the inner core from the cladding is represented by $\Delta_1$, a relative refractive index difference of the outer core from the cladding is represented by $\Delta_2$, and a diameter of the core before tapering when a diameter of the core after tapering is represented by 1 is represented by R, the following expression is preferably satisfied:

$0.1284 \times V_2 - 3 < V_1/R < 0.1284 \times V_2 + 3$ $V_1 = \pi \Delta_1 (r_1^2 - (d/2)^2)$ $V_2 = \pi \Delta_2 (r_2^2 - r_1^2)$ The present inventors have found that, when the optical device satisfies the aforementioned condition, the mode field diameter of light in the LP01 mode is substantially equal at the entrance side and the emission side and the mode field diameter of light in the LP11 mode is substantially equal at the entrance side and the emission side. The management of the mode field diameter of light therefore becomes easier in conducting multimode communication using light in the LP01 mode and light in the LP11 mode, and the multimode communication using lights in these modes can therefore be easily conducted.

Furthermore, a diameter of the core before tapering when a diameter of the core after tapering is represented by 1 is preferably 3 to 5.

As described above, according to the present invention, an optical device capable of suppressing light loss is provided.

BRIEF DESCRIPTION OF THE DRAWINGS

FIGS. 3A and 3B are diagrams illustrating propagation of light in an LP01 mode and light in an LP11 mode through a core 13 of a relay fiber;

FIG. 4 is a view illustrating an optical device according to a second embodiment;

DETAILED DESCRIPTION OF THE INVENTION

Preferred embodiments of an optical device according to the present invention will be described below with reference to the drawings.

First Embodiment

Figure 1:
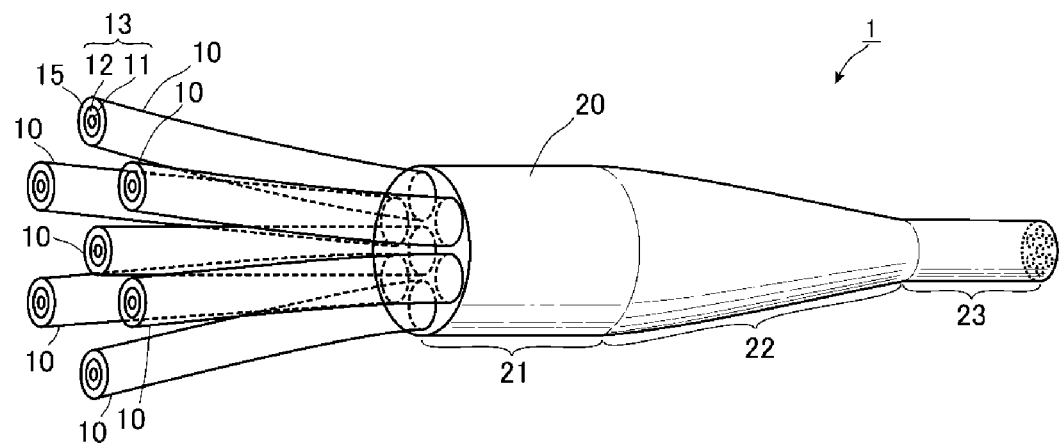
FIG. 1 is a view illustrating an optical device according to a first embodiment.

FIG. 1 is a view illustrating an optical device according to a first embodiment of the present invention. As illustrated in FIG. 1, an optical device 1 of the present embodiment includes multiple relay fibers 10 and a capillary 20 as main components. In this example, the number of relay fibers 10 is seven.

The relay fibers 10 are inserted into the capillary 20 from one end to the other end thereof, and the relay fibers 10 and the capillary 20 are integrated without any gap therebetween. Parts of the relay fibers 10 that are not inserted into the capillary 20 are exposed.

The capillary 20 is circular in cross-section, and includes a large diameter portion 21, a tapered portion 22, and a small diameter portion 23 formed along the longitudinal direction. Such a shape is formed as follows. First, a capillary having through-holes formed therein and having a constant thickness is provided, the number of through-holes being the number of relay fibers 10 to be inserted, and the relay fibers 10 are individually inserted into the respective through-holes. Thereafter, the capillary and the relay fibers 10 are unified by being heated, and the resulting unified capillary and relay fibers is melt-drawn. As a result of drawing, the tapered portion 22 and the small diameter portion 23 are formed. Thus, the respective relay fibers 10 are also tapered with the tapering of the capillary 20 in the tapered portion 22 of the capillary 20, and the respective relay fibers 10 are also reduced in diameter in the small diameter portion 23.

Figure 2A:
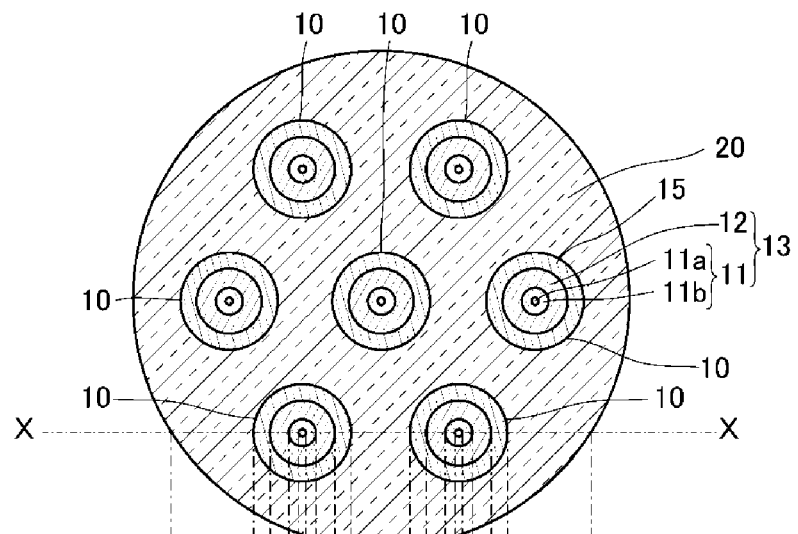
FIGS. 2A and 2B are diagrams illustrating a state of a cross section perpendicular to the longitudinal direction of the optical device at a large diameter portion and a small diameter portion.
Figure 2B:
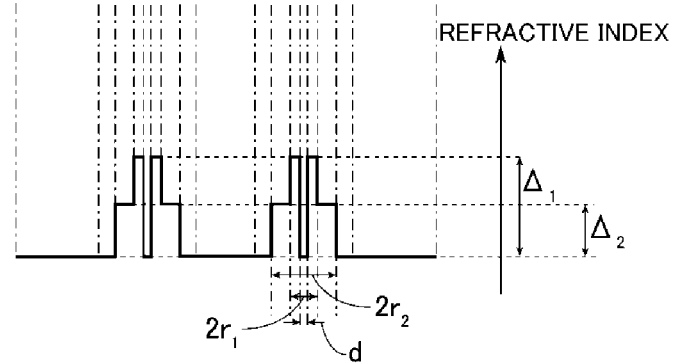

FIGS. 2A and 2B are diagrams illustrating a state of a cross section perpendicular to the longitudinal direction at a position where the capillary 20 of the optical device 1 is included. Specifically, FIG. 2A illustrates a structure at the cross section, and FIG. 2B illustrates a refractive index profile along line X-X of the cross section. In this example, the ratio of the outer diameter of the capillary 20 to the outer diameter of the relay fibers 10 in a cross section perpendicular to the longitudinal direction of the capillary is equal at all of the large diameter portion 21, the tapered portion 22, and the small diameter portion 23. Thus, the position in the capillary 20 of the cross sectional view need not be specified.

As described above, the number of relay fibers 10 is seven in the present embodiment, in which one relay fiber 10 is positioned at the center of the capillary 20 and six relay fibers 10 are positioned around the relay fiber 10 positioned at the center. In this state, lines connecting the centers of the respective relay fibers 10 are in a triangular lattice, and the inter-center pitches the respective relay fibers 10 are equal.

As illustrated in FIGS. 1 and 2A, each of the relay fibers 10 is a single-core optical fiber having a core 13 and cladding 15 surrounding the outer circumferential surface of the core 13 without any gap therebetween, and the core 13 includes an inner core 11 and an outer core 12. Although not illustrated in FIG. 1, the inner core 11 of a relay fiber 10 includes a low-refractive-index portion 11a positioned at the center and a high-refractive-index portion 11b surrounding the outer circumferential surface of the low-refractive-index portion 11a without any gap therebetween. As described above, the ratio of the diameter of each relay fiber 10 to the outer diameter of the capillary 20 is equal at all of the large diameter portion 21, the tapered portion 22, and the small diameter portion 23. Thus, each relay fiber 10 is tapered at the tapered portion 22 from the side of the large diameter portion 21 toward the small diameter portion 23. The low-refractive-index portion 11a, the high-refractive-index portion 11b, the outer core 12 and the cladding 15 constituting the core 13 of each relay fiber 10 are thus tapered from the side of the large diameter portion 21 toward the small diameter portion 23 with ratio of the respective diameters being maintained.

Furthermore, as illustrated in FIG. 2B, the high-refractive-index portion 11b has a refractive index higher than that of the low-refractive-index portion 11a. The outer core 12 has a refractive index lower than that of the high-refractive-index portion 11b. The cladding 15 has a refractive index higher than that of the outer core. Furthermore, in the present embodiment, the low-refractive-index portion 11a has a refractive index equal to that of the cladding 15, and the capillary 20 has the same refractive index as that of the cladding 15.

In the present embodiment, the diameter of the low-refractive-index portion 11a is represented by d, the diameter of the inner core 11 (the outer diameter of the high-refractive-index portion 11b) is represented by $2r_1$, and the diameter of the core 13 (the outer diameter of the outer core 12) is represented by $2r_2$. In addition, the relative refractive index difference of the high-refractive-index portion 11b from the cladding 15 is represented by $\Delta_1$, and the relative refractive index difference of the outer core 12 from the cladding 15 is represented by $\Delta_2$.

Note that the outer diameter of cladding of a typical optical fiber is 125 μm, while the inter-core pitches of a typical multicore fiber is about 30 μm to 50 μm. Thus, the outer diameter of each relay fiber 10 is preferably the same as the outer diameter of the typical optical fiber at the large diameter portion 21, and the inter-core pitches are preferably the inter-core pitches of the typical multicore fiber at the small-diameter portion 23. Furthermore, it is preferable that the wall thickness between the through-holes of the capillary 20 before being tapered be normally 10 μm to 25 μm in light of miniaturization with the strength being ensured. Consequently, when the outer diameter of the capillary 20 at the small diameter portion 23 after being tapered is represented by 1, the outer diameter of the capillary 20 at the large-diameter portion 21 before being tapered, that is, the drawing ratio of the large diameter portion 21 to the small diameter portion 23 is preferably (125+(10 to 25))/(30 to 50)=3 to 5. This drawing ratio is equal to that of the core 13.

Light propagates through each of the cores 13 of such an optical device 1 as follows. FIGS. 3A and 3B are diagrams illustrating propagation of light in the LP01 mode and light in the LP11 mode through the core 13 of each relay fiber 10. Specifically, FIG. 3A illustrates the core 13 on the side of the large diameter portion 21 and on the side of the small diameter portion 23, and FIG. 3B illustrates electric fields of the light in the LP01 mode and the light in the LP11 mode on the side of the large diameter portion 21 and on the side of the small diameter portion 23.

As illustrated in FIGS. 3A and 3B, at the large diameter portion 21 where the relay fibers 10 are not tapered, each outer core 12 functions as cladding for each inner core 11 and lights in the respective modes propagate through the inner core 11. In order that light propagates in this manner, when the wavelength of light is 1550 nm, for example, the relative refractive index difference $\Delta_1$ of the high-refractive-index portion 11b from the cladding 15 may be 1.82, the relative refractive index difference $\Delta_2$ of the outer core 12 from the cladding 15 may be 1.11, the diameter d of the low-refractive-index portion 11a may be 4.22 μm, and the diameter $2r_1$ of the inner core 11 at the large diameter portion 21 may be 8.44 μm.

As light propagating through the inner core 11 travels from the large diameter portion 21 toward the small diameter portion 23, the core 13 is tapered at the tapered portion 22. Thus, leakage of lights in the respective modes propagating through the inner core 11 from the inner core 11 to the outer core 12 is increased. Consequently, at the small diameter portion 23, the respective lights diffuse to the outer core 12 and propagate through the entire core 13 combining the inner core 11 and the outer core 12. The light in the LP01 mode and the light in the LP11 mode, however, do not diffuse to the outer core 12 at the same position at the tapered portion 22, but the lights in the respective modes diffuse to the outer core 12 at least before the lights reach the small diameter portion 23 and propagate through the core 13 combining the inner core 11 and the outer core 12. In order that light propagates in this manner, when the wavelength is 1550 nm as described above, for example, the relative refractive index difference of the outer core 12 from the cladding 15 is the same as that described above, and thus the diameter $2r_2$ of the core 13 at the small diameter portion 23 may be 3.93 µm.

Note that the light in the LP11 mode has its light intensity peak at an off-center position. The light in the LP11 mode propagating through the inner core 11 thus easily diffuse to the outer core 12 at the portion where the inner core 11 is tapered. The light in the LP01 mode, however, has its intensity peak at the center of the core. The light in the LP01 mode propagating through the inner core 11 thus tends not to diffuse to the outer core 12 even at the portion where the inner core 11 is tapered, so that the refractive index of the inner core 11 in the radial direction is constant. In the optical device 1 of the present embodiment, however, since the inner core 11 has such a structure in which the low-refractive-index portion 11a positioned at the center of the inner core 11 is surrounded by the high-refractive-index portion 11b, light in the LP01 mode is likely to diffuse to the outer core 12 with the tapering of the inner core 11 as compared to a case where the inner core 11 has a constant refractive index. Note that the ratio of the diameter d of the low-refractive-index portion 11a to the outer diameter $2r_1$ of the high-refractive-index portion 11b is preferably not smaller than 0.3 and not larger than 0.6. Since the ratio is not smaller than 0.3, light in the LP01 mode can easily diffuse to the outer core 12 at the tapered portion, and since the ratio is not larger than 0.6, light can easily propagate in the inner core 11 before the tapering.

As described above, according to the optical device of the present embodiment, light in the LP01 mode and light in the LP11 mode can easily be switched from the state propagating through the inner core 11 to the state propagating through the entire core 13 combining the inner core 11 and the outer core 12 with the tapering of the core 13. It is therefore possible to suppress the increase in the difference in the mode field diameter at emission of lights in the respective modes from that at entrance of the lights. When a multicore fiber is connected to the small diameter portion 23, light loss can therefore be suppressed when light emitted from each core 13 enters the multicore fiber or the like.

Second Embodiment

Next, a second embodiment of the present invention will be described. Here, components that are identical or similar to those in the first embodiment are designated by the same reference numerals and redundant description will not be repeated unless the description is particularly stated.

Figure 5A:
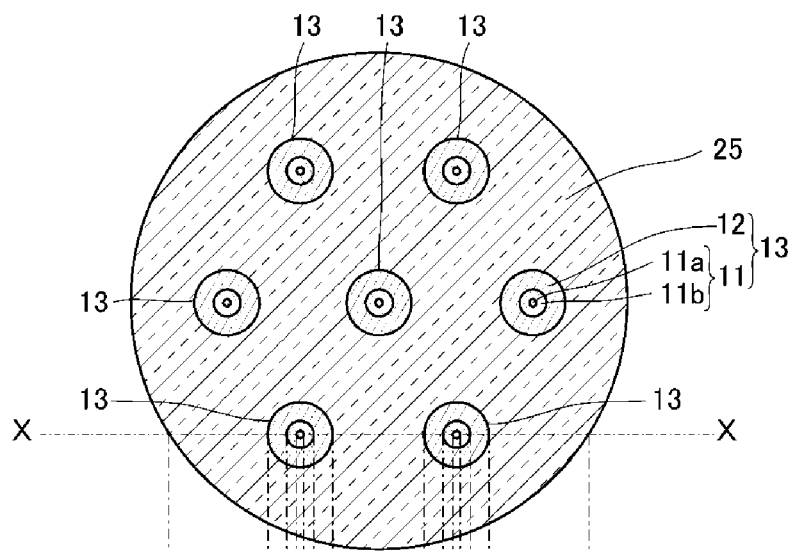
FIGS. 5A and 5B are diagrams illustrating a state of a cross section perpendicular to the longitudinal direction of the optical device of FIG. 4.
Figure 5B:
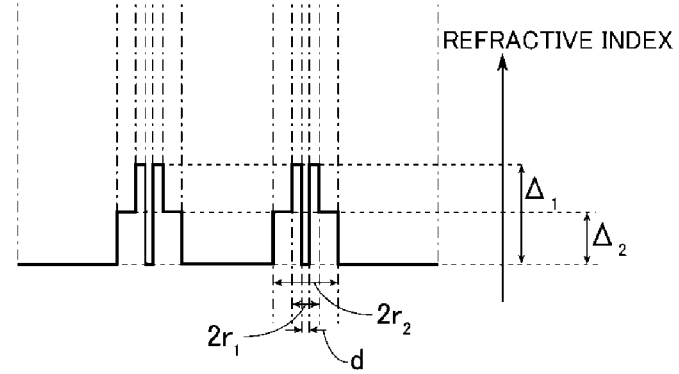

FIG. 4 is a view illustrating an optical device according to the second embodiment of the present invention, and FIGS. 5A and 5B are diagrams illustrating a state of a cross section perpendicular to the longitudinal direction of the optical device 2 of FIG. 4. As illustrated in FIGS. 4, 5A, and 5B, the optical device 2 of the present embodiment is different from the optical device of the first embodiment in that the outer circumferential surface of the core 13 is surrounded by cladding 25 made of the same glass material as the capillary 20 of the first embodiment without any space therebetween and that the core 13 is positioned only in the cladding 25. Specifically, the optical device 2 of the present embodiment is equivalent to an optical device obtained by removing the portions of the relay fibers 10 exposed from the capillary 20 of the optical device 1 of the first embodiment, removing the respective claddings 15, and filling the spaces produced as a result of removing the claddings 15 with the capillary 20.

Such an optical device may be formed by forming a multicore fiber having a cross-sectional structure as illustrated in FIG. 5A and having a thickness equal to that of the large diameter portion 21 and forming the tapered portion 22 and the small diameter portion 23 by melt-drawing the formed multicore fiber.

In the optical device 2 of the present embodiment, the drawing ratio of the large diameter portion 21 to the small diameter portion 23 is preferably the same as that in the first embodiment.

With such an optical device 2 using a multicore fiber, multimode light can also be propagated similarly to the optical device 1 of the first embodiment.

While the present invention has been described above by reference to the embodiments as examples, the present invention is not limited thereto.

For example, the number of relay fibers 10 in the first embodiment and the number of cores 13 in the second embodiment can be changed as appropriate.

Furthermore, although the refractive index of the cladding 15 and that of the capillary 20 are equal to each other in the first embodiment, the refractive index of the cladding 15 and that of the capillary 20 may be different from each other.

Figure 13:
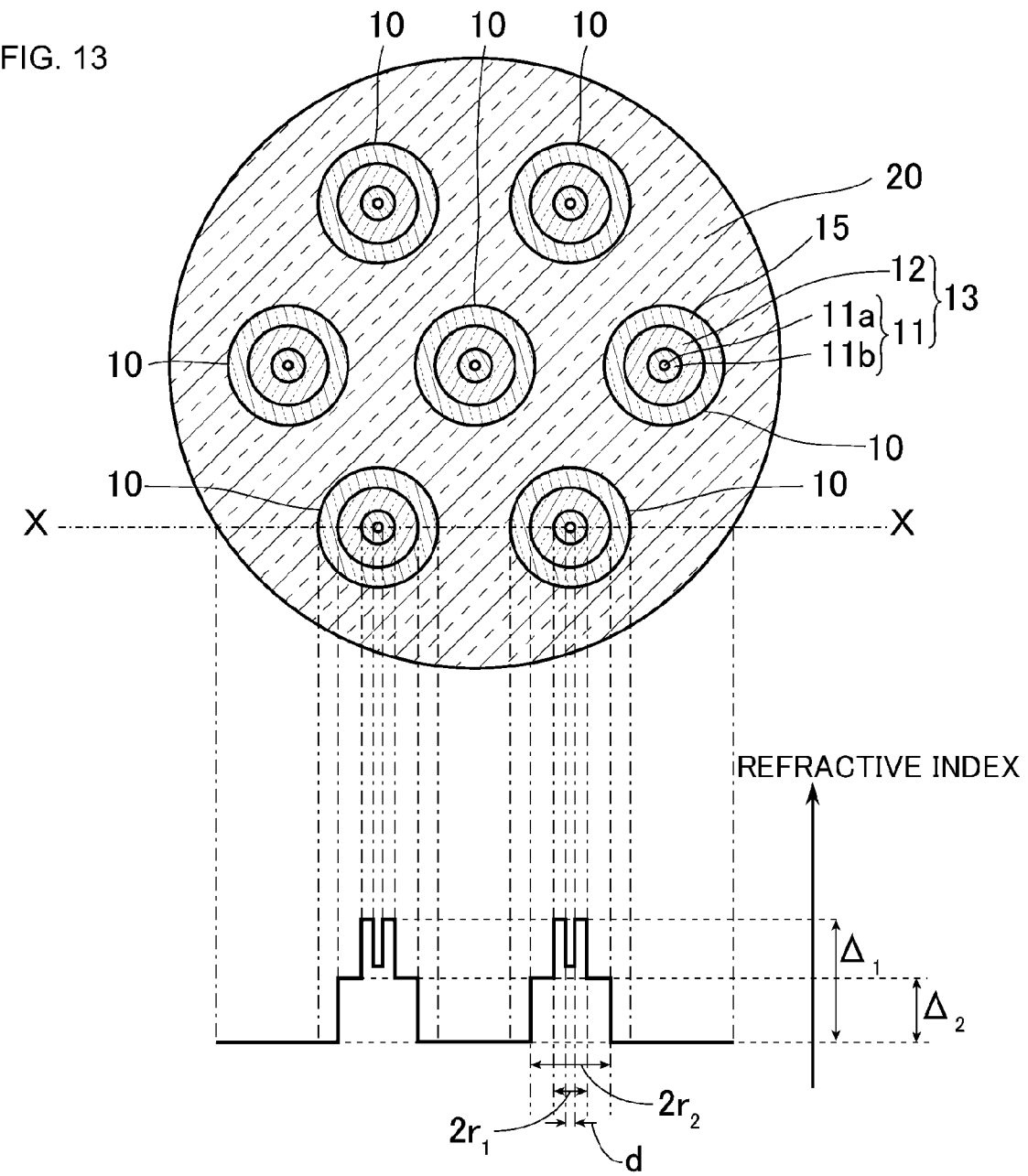
FIG. 13 is a diagram illustrating a state of a cross section perpendicular to the longitudinal direction of the optical device.
Figure 14:
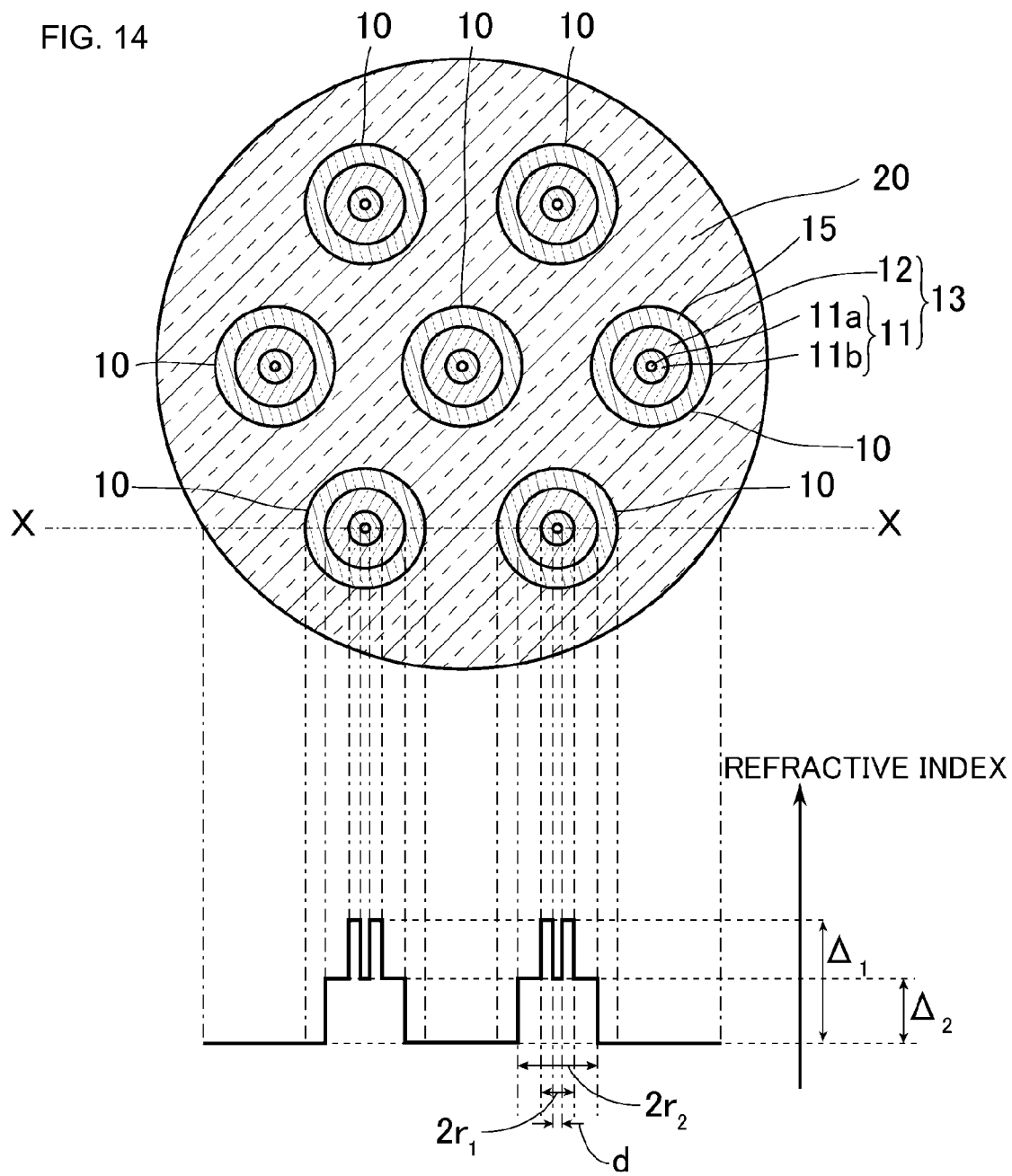
FIG. 14 is a diagram illustrating a state of a cross section perpendicular to the longitudinal direction of the optical device.

Furthermore, the refractive index of the low-refractive-index portion 11a is equal to that of the cladding 15 in the first embodiment, and the refractive index of the low-refractive-index portion 11a is equal to that of the cladding 25 in the second embodiment. The refractive index of the low-refractive-index portion 11a can, however, be changed as appropriate as long as the refractive index is lower than that of the high-refractive-index portion 11b. For example, the low-refractive-index portion 11a may have a refractive index that is between the refractive index of the high-refractive-index portion 11b and the refractive index of the outer core 12 (as shown by FIG. 13). Alternatively, the low-refractive-index portion 11a may have a refractive index equal to or lower than that of the outer core 12, and in this case, the low-refractive-index portion 11a preferably has a refractive index equal to that of the outer core 12 (as shown by FIG. 14). When the refractive index of the low-refractive-index portion 11a and that of the outer core 12 are equal to each other, the refractive index profile of the core 13 can be made closer to constant than the case in which the refractive index of the low-refractive-index portion 11a is different from that of the outer core 12. Alternatively, the low-refractive-index portion 11a may have a refractive index that is between the refractive index of the outer core 12 and the refractive index of the cladding 15, 25. Alternatively, the low-refractive-index portion 11a may have a refractive index equal to or lower than that of the cladding 15, 25 and in this case, the low-refractive-index portion 11a may have a refractive index equal to that of the cladding 15, 25 as in the embodiments above.

EXAMPLES

The present invention will be more concretely explained below with reference to examples and a comparative example, but the present invention is not limited thereto. Note that the following examples and comparative example are obtained through computer simulation using the finite element method.

Example 1

A simulation is conducted using the optical device 1 of the first embodiment as a model. In the present model, the low-refractive-index portion 11a had a refractive index equal to that of the cladding 15 similarly to the first embodiment. Furthermore, the ratio ($d/2r_1$) of the diameter d of the low-refractive-index portion 11a of the inner core 11 to the outer diameter $2r_1$ of the high-refractive-index portion 11b is set to 0.3.

Subsequently, conditions under which the effective area $A_{eff}$ of light in the LP01 mode is 110 μm² and the effective area $A_{eff}$ of light in the LP11 mode is 170 μm² at the large diameter portion 21 are obtained. Specifically, the radius $r_1$ of the inner core 11 and the relative refractive index difference $\Delta_1$ of the high-refractive-index portion 11b from the cladding 15 are obtained for each of the cases where the relative refractive index difference $\Delta_2$ of the outer core 12 from the cladding 15 is 0.5, 1.0, and 1.5. The result is shown in Table 1.

TABLE 1

| $\Delta_2$ [%] | $r_1$ [μm] | $\Delta_1$ [%] |
|---|---|---|
| 0.5 | 5.010 | 0.981 |
| 1.0 | 4.828 | 1.494 |
| 1.5 | 4.717 | 2.001 |

Subsequently, under the conditions of Table 1, the radius $r_2$ of the outer core 12 with which the effective area of light in the LP01 mode is equal at the large diameter portion 21 and the small diameter portion 23 and the radius $r_2$ of the outer core 12 with which the effective area of light in the LP11 mode is equal at the large diameter portion 21 and the small diameter portion 23 are obtained for each of the cases where the diameter of the large diameter portion when the diameter of the core 13 at the small diameter portion 23 is represented by 1 is 3, 4, and 5, that is, each of the cases where the drawing ratio R is 3, 4, and 5. The result is illustrated in FIG. 6.

Figure 6:
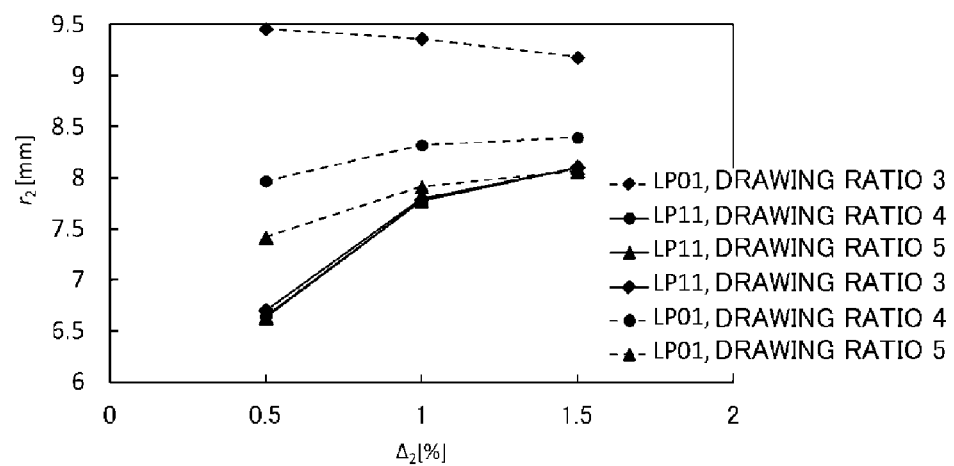
FIG. 6 is a graph illustrating a relation between the relative refractive index difference $\Delta_2$ and the radius $r_2$ of an outer core in Example 1.

In FIG. 6, the relation between $\Delta_2$ and $r_2$ with which light in the LP01 mode has the same effective area at the large diameter portion 21 and the small diameter portion 23 and the relation between $\Delta_2$ and $r_2$ with which light in the LP11 mode has the same effective area at the large diameter portion 21 and the small diameter portion 23 when the drawing ratio R is 3 are represented by rhomboid marks. In addition, the relation between $\Delta_2$ and $r_2$ with which light in the LP01 mode has the same effective area at the large diameter portion 21 and the small diameter portion 23 and the relation between $\Delta_2$ and $r_2$ with which light in the LP11 mode has the same effective area at the large diameter portion 21 and the small diameter portion 23 when the drawing ratio R is 4 are represented by circular marks. Furthermore, the relation between $\Delta_2$ and $r_2$ with which light in the LP01 mode has the same effective area at the large diameter portion 21 and the small diameter portion 23 and the relation between $\Delta_2$ and $r_2$ with which light in the LP11 mode has the same effective area at the large diameter portion 21 and the small diameter portion 23 when the drawing ratio R is 5 are represented by triangular marks.

Furthermore, a line connecting the rhomboid marks, a line connecting the circular marks, and the line connecting the triangular marks for the light in the LP01 mode are illustrated by broken lines, and a line connecting the rhomboid marks, a line connecting the circular marks, and the line connecting the triangular marks for the light in the LP11 mode are illustrated by solid lines.

As is clear from FIG. 6, the broken line and the solid line connecting the triangular marks intersect with each other at $\Delta_2$ of about 1.5 and $r_2$ of about 8.1 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 5. This therefore shows that the condition under which incident light and emitted light have an equal effective area for both of light in the LP01 mode and light in the LP11 mode is obtained when the drawing ratio R is 5.

Example 2

Conditions under which the effective area $A_{eff}$ of light in the LP01 mode is 110 μm² and the effective area $A_{eff}$ of light in the LP11 mode is 170 μm² at the large diameter portion 21 are obtained similarly to Example 1 except that the ratio ($d/2r_1$) of the diameter d of the low-refractive-index portion 11a of the inner core 11 to the outer diameter $2r_1$ of the high-refractive-index portion 11b is 0.4. The result is shown in Table 2.

TABLE 2

| $\Delta_2$ [%] | $r_1$ [μm] | $\Delta_1$ [%] |
|---|---|---|
| 0.5 | 4.670 | 1.049 |
| 1.0 | 4.506 | 1.577 |
| 1.5 | 4.409 | 2.095 |

Subsequently, under the conditions of Table 2, the radius $r_2$ of the outer core 12 with which the effective area of light in the LP01 mode is equal at the large diameter portion 21 and the small diameter portion 23 and the radius $r_2$ of the outer core 12 with which the effective area of light in the LP11 mode is equal at the large diameter portion 21 and the small diameter portion 23 are obtained for each of the cases where the drawing ratio R is 3, 4, and 5. The result is illustrated in FIG. 7 in the same manner as in FIG. 6.

Figure 7:
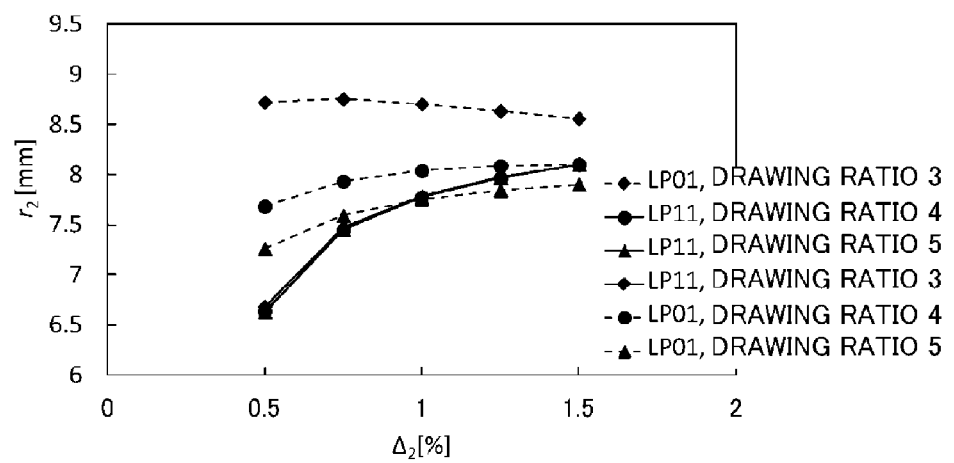
FIG. 7 is a graph illustrating a relation between the relative refractive index difference $\Delta_2$ and the radius $r_2$ of an outer core in Example 2.

As is clear from FIG. 7, the broken line connecting the triangular marks and the solid line connecting the triangular marks intersect with each other at $\Delta_2$ of about 1.0 and $r_2$ of about 7.8 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 5. Furthermore, the broken line connecting the circular marks and the solid line connecting the circular marks intersect with each other at $\Delta_2$ of about 1.5 and $r_2$ of about 8.1 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 4. This therefore shows that the conditions under which incident light and emitted light have an equal effective area for both of light in the LP01 mode and light in the LP11 mode are obtained when the drawing ratio R is 4 and 5.

Example 3

Conditions under which the effective area $A_{\it eff}$ of light in the LP01 mode is 110 μm² and the effective area $A_{\it eff}$ of light in the LP11 mode is 170 μm² at the large diameter portion 21 are obtained similarly to Example 1 except that the ratio $(d/2r_1)$ of the diameter d of the low-refractive-index portion 11a of the inner core 11 to the outer diameter $2r_1$ of the high-refractive-index portion 11b is 0.5. The result is shown in Table 3.

TABLE 3

| $\Delta_2$ [%] | $r_1$ [μm] | $\Delta_1$ [%] |
| --- | --- | --- |
| 0.5 | 4.395 | 1.157 |
| 1.0 | 4.249 | 1.707 |
| 1.5 | 4.163 | 2.240 |

Subsequently, under the conditions of Table 3, the radius $r_2$ of the outer core 12 with which the effective area of light in the LP01 mode is equal at the large diameter portion 21 and the small diameter portion 23 and the radius $r_2$ of the outer core 12 with which the effective area of light in the LP11 mode is equal at the large diameter portion 21 and the small diameter portion 23 are obtained for each of the cases where the drawing ratio R is 3, 4, and 5. The result is illustrated in FIG. 8 in the same manner as in FIG. 6.

Figure 8:
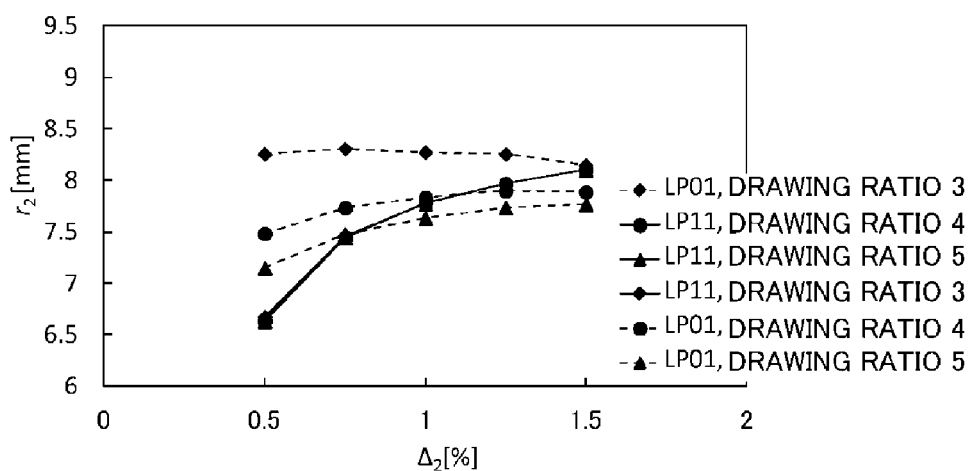
FIG. 8 is a graph illustrating a relation between the relative refractive index difference $\Delta_2$ and the radius $r_2$ of an outer core in Example 3.

As is clear from FIG. 8, the broken line connecting the triangular marks and the solid line connecting the triangular marks intersect with each other at $\Delta_2$ of about 0.8% and $r_2$ of about 7.5 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 5. Furthermore, the broken line connecting the circular marks and the solid line connecting the circular marks intersect with each other at $\Delta_2$ of about 1.1% and $r_2$ of about 7.8 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 4. Furthermore, the broken line connecting the rhomboid marks and the solid line connecting the rhomboid marks intersect with each other at $\Delta_2$ of about 1.5% and $r_2$ of about 8.2 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 3. This therefore shows that the conditions under which incident light and emitted light have an equal effective area for both of light in the LP01 mode and light in the LP11 mode are obtained when the drawing ratio R is 3, 4 and 5.

Example 4

Conditions under which the effective area $A_{\it eff}$ of light in the LP01 mode is 110 μm² and the effective area $A_{\it eff}$ of light in the LP11 mode is 170 μm² at the large diameter portion 21 are obtained similarly to Example 1 except that the ratio $(d/2r_1)$ of the diameter d of the low-refractive-index portion 11a of the inner core 11 to the outer diameter $2r_1$ of the high-refractive-index portion 11b is 0.6. The result is shown in Table 4.

TABLE 4

| $\Delta_2$ [%] | $r_1$ [μm] | $\Delta_1$ [%] |
| --- | --- | --- |
| 0.5 | 4.164 | 1.331 |
| 1.0 | 4.032 | 1.916 |
| 1.5 | 3.957 | 2.478 |

Subsequently, under the conditions of Table 4, the radius $r_2$ of the outer core 12 with which the effective area of light in the LP01 mode is equal at the large diameter portion 21 and the small diameter portion 23 and the radius $r_2$ of the outer core 12 with which the effective area of light in the LP11 mode is equal at the large diameter portion 21 and the small diameter portion 23 are obtained for each of the cases where the drawing ratio R is 3, 4, and 5. The result is illustrated in FIG. 9 in the same manner as in FIG. 6.

Figure 9:
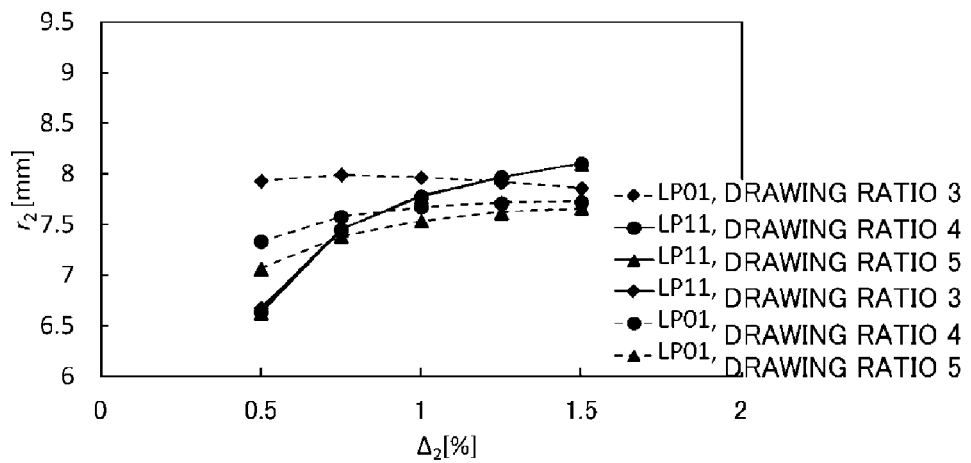
FIG. 9 is a graph illustrating a relation between the relative refractive index difference $\Delta_2$ and the radius $r_2$ of an outer core in Example 4.

As is clear from FIG. 9, the broken line connecting the triangular marks and the solid line connecting the triangular marks intersect with each other at $\Delta_2$ of about 0.7% and $r_2$ of about 7.4 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 5. Furthermore, the broken line connecting the circular marks and the solid line connecting the circular marks intersect with each other at $\Delta_2$ of about 0.9% and $r_2$ of about 7.7 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 4. Furthermore, the broken line connecting the rhomboid marks and the solid line connecting the rhomboid marks intersect with each other at $\Delta_2$ of about 1.2% and $r_2$ of about 7.9 μm. This means that light in the LP01 mode propagating through the large diameter portion 21 and light in the LP01 mode propagating through the small diameter portion 23 have an equal effective area and that light in the LP11 mode propagating through the large diameter portion 21 and light in the LP11 mode propagating through the small diameter portion 23 have an equal effective area when the drawing ratio R is 3. This therefore shows that the conditions under which incident light and emitted light have an equal effective area for both of light in the LP01 mode and light in the LP11 mode are obtained when the drawing ratio R is 3, 4 and 5.

Comparative Example 1

Conditions under which the effective area $A_{eff}$ of light in the LP01 mode is 110 μm² and the effective area $A_{eff}$ of light in the LP11 mode is 170 μm² at the large diameter portion 21 when the drawing ratio is 4 and 5 are obtained similarly to Example 1 except that the ratio ($d/2r_1$) of the diameter d of the low-refractive-index portion 11a of the inner core 11 to the outer diameter $2r_1$ of the high-refractive-index portion 11b is 0 (the portion to be the inner core 11 is entirely filled with the high-refractive-index portion 11b). The result is shown in Table 5.

TABLE 5

| $\Delta_2$ [%] | $r_1$ [μm] | $\Delta_1$ [%] |
|---|---|---|
| 0.5 | 6.639 | 0.996 |
| 1.0 | 6.638 | 1.486 |
| 1.5 | 6.638 | 1.976 |

Subsequently, under the conditions of Table 5, the radius $r_2$ of the outer core 12 with which the effective area of light in the LP01 mode is equal at the large diameter portion 21 and the small diameter portion 23 and the radius $r_2$ of the outer core 12 with which the effective area of light in the LP11 mode is equal at the large diameter portion 21 and the small diameter portion 23 are obtained for each of the cases where the drawing ratio R is 4 and 5. The result is illustrated in FIG. 10 in the same manner as in FIG. 6.

Figure 10:
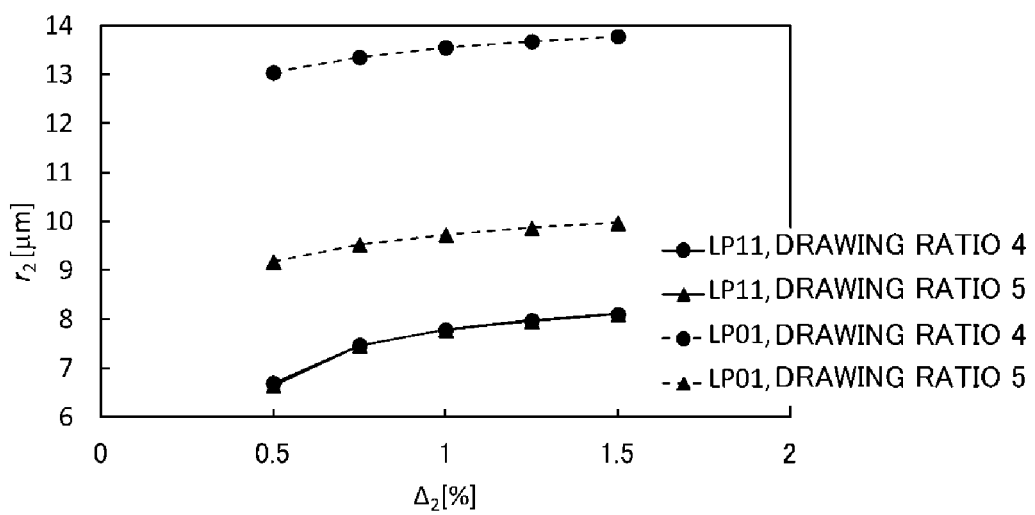
FIG. 10 is a graph illustrating a relation between the relative refractive index difference $\Delta_2$ and the radius $r_2$ of an outer core in Comparative Example 1.

As is clear from FIG. 10, the broken line connecting the triangular marks and the solid line connecting the triangular marks do not intersect with each other. Furthermore, the broken line connecting the circular marks and the solid line connecting the circular marks do not intersect with each other. This means that there is no state in which light in the LP01 mode propagating through the large diameter portion 21 and light in the LP01 mode propagating through the small diameter portion 23 have an equal effective area and in which light in the LP11 mode propagating through the large diameter portion 21 and light in the LP11 mode propagating through the small diameter portion 23 have an equal effective area when the drawing ratio R is 4 or 5. These results show that there is no state, either, in which light in the LP01 mode propagating through the large diameter portion 21 and light in the LP01 mode propagating through the small diameter portion 23 have an equal effective area and in which light in the LP11 mode propagating through the large diameter portion 21 and light in the LP11 mode propagating through the small diameter portion 23 have an equal effective area when the drawing ratio is 3.

As described above, according to the present invention, it is shown that conditions under which incident light and emitted light have an equal effective area for both of light in the LP01 mode and light in the LP11 mode are present.

Next, volumes of the relative refractive index differences of high-refractive-index portion 11b and the outer core 12 are obtained under conditions under which the effective area of incident light and the effective area of emitted light are equal for both of light in the LP01 mode and light in the LP11 mode in Examples 1 to 4. The volume $V_1$ of the relative refractive index difference of the high-refractive-index portion 11b can be obtained by multiplying the area of the high-refractive-index portion 11b at a cross section perpendicular to the longitudinal direction of the core 13 by the relative refractive index difference $\Delta_1$ of the high-refractive-index portion 11b. The volume $V_1$ of the relative refractive index difference is thus expressed by the following expression.

$$V_1 = \pi \Delta_1 (r_1^2 - (d/2)^2)$$

The volume $V_2$ of the relative refractive index difference of the outer core 12 can be obtained by multiplying the area of the outer core 12 at a cross section perpendicular to the longitudinal direction of the core 13 by the relative refractive index difference $\Delta_2$ of the outer core 12. The volume $V_2$ of the relative refractive index difference is thus expressed by the following expression.

$$V_2 = \pi \Delta_2 (r_2^2 - r_1^2)$$

Figure 11:
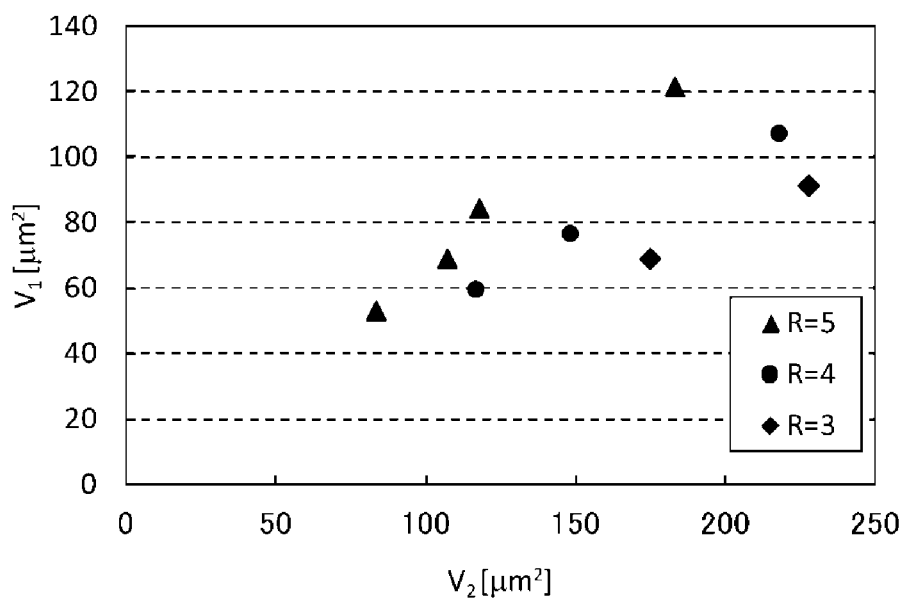
FIG. 11 is a graph illustrating a relation between a volume $V_1$ of the relative refractive index difference of a high-refractive-index portion and a volume $V_2$ of the relative refractive index difference of the outer core.

The relation between the obtained volume $V_1$ of the relative refractive index difference of the high-refractive-index portion 11b and the obtained volume $V_2$ of the relative refractive index difference of the outer core 12 is illustrated in FIG. 11. The volume $V_1$ of the relative refractive index difference is a parameter strongly affecting the effective area before drawing. This value needs to be larger as the diameter d of the central low-refractive-index portion is larger since the refractive index is effectively lowered accordingly. In contrast, the volume $V_2$ of the relative refractive index difference is a parameter strongly affecting the effective area after drawing. When the parameter $V_1$ before drawing is large, it is difficult to obtain a desired effective area $A_{eff}$ unless the parameter $V_2$ is increased accordingly. On the basis of these correlations, a proportional relation between the parameter $V_1$ and the parameter $V_2$ according to the drawing ratio is considered to be present.

Figure 12:
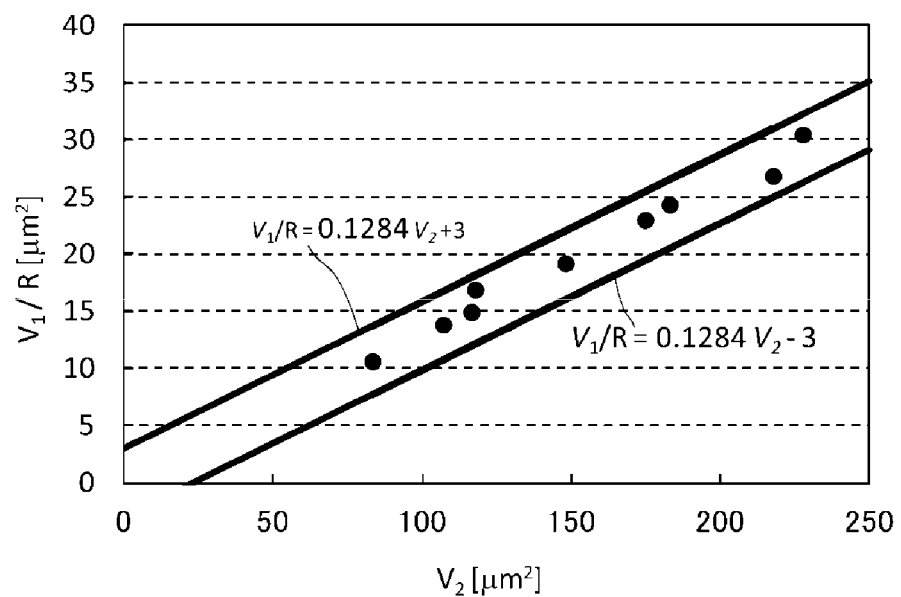
FIG. 12 illustrates a relation between a value obtained by dividing the volume $V_1$ of the relative refractive index difference by a drawing ratio R and the volume $V_2$ of the relative refractive index difference.

Next, the relation between a value obtained by dividing the obtained volume $V_1$ of the relative refractive index difference by the drawing ratio R and the obtained volume $V_2$ of the relative refractive index difference is illustrated in FIG. 12. As described above, the volume $V_2$ of the relative refractive index difference is a parameter relating to the effective area after drawing, and a more general relation with the parameter $V_1$ can be considered to be obtained by dividing the volume $V_2$ by the drawing ratio R. The relation between $V_2$ and $V_1/R$ is plotted from FIG. 11 as illustrated in FIG. 12, and a result that the effective area of incident light and that of emitted light are equal for both of lights in the LP01 mode and the LP11 mode in a region where the volume $V_1$ of the relative refractive index difference and the volume $V_2$ of the relative refractive index difference satisfy the following relation is obtained by the method of least-squares of the plots.

$$0.1284 \times V_2 - 3 < V_1/R < 0.1284 \times V_2 + 3$$

As described above, the conditions under which the effective area of incident light and that of emitted light are equal for both of light in the LP01 mode and light in the LP11 mode are obtained.

When the relative refractive index difference of the low-refractive-index portion 11a from the cladding is represented by $\Delta_0$, the volume $V_0$ of the relative refractive index difference of the low-refractive-index portion 11a is expressed by the following expression.

$$V_0 = \pi \Delta_0 (d/2)^2$$

The volume $V_0$ of the relative refractive index difference and the volume $V_1$ of the relative refractive index difference of the high-refractive-index portion 11b preferably satisfy the predetermined relation in a predetermined perspective.

The invention claimed is:

1. An optical device comprising:

multiple cores each including an inner core and an outer core surrounding an outer circumferential surface of the inner core without any gap therebetween; and cladding surrounding an outer circumferential surface of the cores without any gap therebetween and having a refractive index lower than that of the outer core, wherein each of the cores has a tapered portion that is tapered from one side toward the other side thereof in a longitudinal direction, each of the inner cores includes a low-refractive-index portion, and a high-refractive-index portion surrounding an outer circumferential surface of the low-refractive-index portion without any gap therebetween and having a refractive index higher than that of the low-refractive-index portion, and the outer core has a refractive index lower than that of the high-refractive-index portion, wherein each of the cores has one end located on the one side thereof and an opposite end located on the other side thereof, and each of the cores has a larger diameter at the one end than a diameter at the opposite end, wherein a first light in LP01 mode and a second light in higher-order mode higher than LP01 mode propagate substantially within each of the inner cores at the one end, and the first light and the second light propagate through each of the outer cores and corresponding one of the inner cores at the opposite end, wherein the low-refractive-index portion has a refractive index not larger than the refractive index of the outer core, wherein the low-refractive-index portion has a refractive index not larger than the refractive index of the cladding, wherein the low-refractive-index portion has a refractive index equal to the refractive index of the cladding, and wherein when a radius of the inner core is represented by $r_1$, a radius of an outer circumference of the outer core is represented by $r_2$, a diameter of the low-refractive-index portion is represented by d, a relative refractive index difference of the inner core from the cladding is represented by $\Delta_1$, a relative refractive index difference of the outer core from the cladding is represented by $\Delta_2$, and a diameter of the core before tapering when a diameter of the core after tapering is represented by 1 is represented by R, the following expression is satisfied:

$$0.1284 \times V_2 - 3 < V_1/R < 0.1284 \times V_2 + 3$$

$$V_1 = \pi \Delta_1 (r_1^2 - (d/2)^2)$$

$$V_2 = \pi \Delta_2 (r_2^2 - r_1^2).$$

2. The optical device according to claim 1, wherein a diameter of the core before tapering when a diameter of the core after tapering is represented by 1 is 3 to 5.

3. The optical device according to claim 1, wherein a ratio of a diameter of the low-refractive-index portion to an outer diameter of the high-refractive-index portion is not smaller than 0.3 and not larger than 0.6.

* * * * *